United States Patent
Böhm et al.

(10) Patent No.: US 6,345,225 B1
(45) Date of Patent: Feb. 5, 2002

(54) ELECTROMECHANICAL BRAKE SYSTEM

(75) Inventors: Jürgen Böhm, Oberneisen; Stefan Stölzl, Weinheim; Peter Willimowski, Bruchköbel; Joachim Nell, Hanau; Rainer Oehler, Darmstadt, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/554,795

(22) PCT Filed: Nov. 20, 1998

(86) PCT No.: PCT/EP98/07471

§ 371 Date: Aug. 11, 2000

§ 102(e) Date: Aug. 11, 2000

(87) PCT Pub. No.: WO99/26822

PCT Pub. Date: Jun. 3, 1999

(30) Foreign Application Priority Data

Nov. 22, 1997 (DE) .......................... 197 51 917
Nov. 22, 1997 (DE) .......................... 197 51 916
Jul. 17, 1998 (DE) .......................... 198 32 167

(51) Int. Cl.[7] .................. G06F 15/00; G06F 17/00; G06F 19/00
(52) U.S. Cl. .................. 701/70; 701/71; 701/72; 701/76; 701/78; 701/79; 701/81-83; 701/92; 303/91; 303/92; 303/100; 303/11; 303/10; 280/707; 180/65.2; 180/79.1; 180/197; 180/140; 180/142; 180/143; 180/243
(58) Field of Search .................. 701/70, 71, 72, 701/78, 76, 79, 81–83, 92; 303/100, 92, 91, 11, 10, 113.4; 280/707; 180/79.1, 197, 243, 65.2, 242, 140, 142, 143; 73/126; 318/430; 74/866

(56) References Cited

U.S. PATENT DOCUMENTS

| | | | | |
|---|---|---|---|---|
| 3,899,916 A | * | 8/1975 | Cline .......................... 73/126 |
| 4,926,955 A | * | 5/1990 | Ohmura et al. ............. 180/140 |
| 5,214,983 A | * | 6/1993 | Kobayashi et al. ........... 74/866 |
| 5,335,979 A | * | 8/1994 | Naitou et al. ................. 303/92 |
| 5,368,120 A | * | 11/1994 | Sakai et al. ................. 180/197 |
| 5,383,679 A | * | 1/1995 | Nakamura et al. .......... 280/707 |
| 5,973,463 A | * | 10/1999 | Okuda et al. ................ 318/430 |
| 6,133,197 A | * | 9/2000 | Kuroki et al. ................ 303/11 |

FOREIGN PATENT DOCUMENTS

| | | |
|---|---|---|
| DE | 35 04 096 | 8/1986 |
| DE | 40 22 671 | 1/1992 |
| DE | 40 29 334 | 3/1992 |
| DE | 41 29 287 | 3/1992 |
| DE | 43 39 570 | 5/1995 |
| DE | 44 38 017 | 5/1996 |
| DE | 195 21 175 | 7/1996 |
| DE | 195 10 525 | 9/1996 |
| DE | 195 13 004 | 10/1996 |
| DE | 195 48 392 | 7/1997 |
| DE | 196 31 309 | 2/1998 |
| DE | 196 34 567 | 3/1998 |
| WO | 95 13946 | 5/1995 |

* cited by examiner

Primary Examiner—William A. Cuchlinski, Jr.
Assistant Examiner—Ronnie Mancho
(74) Attorney, Agent, or Firm—Rader, Fishman & Grauer PLLC

(57) ABSTRACT

This invention relates to an electromechanical brake system, in particular for automotive vehicles, which includes a pedal module and at least two brake modules. Further, a central module may be provided. Connection between the aforementioned modules can be made by a data bus. The data bus is provided redundantly. In one embodiment, the central module can evaluate signals of a sensor system and examine them for their errors. Further, the central module can emit a corresponding nominal braking value which then is emitted to the brake modules. Thereupon, the brake modules determine appropriate actuating signals for the actuators which interact with the wheels in order to realize the driver's braking intention.

14 Claims, 5 Drawing Sheets

ELECTROMECHANICAL BRAKE SYSTEM

TECHNICAL FIELD

This invention generally relates to brake systems and more particularly relates to an electromechanical brake system and to a method for controlling an electromechanical brake system.

BACKGROUND OF THE INVENTION

The more recent developments of current brake technology are directed towards research work on electric brake systems. Today's hydraulic cylinders which apply the brake linings to the brake disc are replaced on each disc by a high-capacity electric motor. The electric brake does not need any mechanical or hydraulic parts such as vacuum brake boosters or tandem master cylinders. Further, the electric brake can take over the brake's functions of today as well as functions of the future such as anti-lock brake system (ABS), traction slip control (TSC), electronic stability program (ESP) as well as the automatic brake management as it may, e.g., be provided with collision avoidance systems.

One example of such a system is disclosed in WO 95/13946. This so-called electronic brake system includes a central module and brake modules associated with the brake circuits or wheel groups. The central module of this disclosure may perform ABS and TSC computations, can adjust the braking force distribution and determine wheel-specific nominal braking pressure values.

It is an object of this invention to provide an electromechanical brake system and a method for controlling an electromechanical brake system, in particular for automotive vehicles, which features a safe and, simultaneously, low-cost design and only requires a minor installation effort, as well.

According to this invention, an electromechanical brake system is provided, in particular for automotive vehicles, which includes a pedal module for redundant detection of a drivers brake pedal actuation by means of a suitable sensor system. Further, the brake system may include a device for determining a nominal braking value on the basis of the driver's intention and a brake module for actuating at least one wheel brake on the basis of the nominal braking value. Further, there is preferably a data transfer unit which is provided redundantly and which establishes a data flow connection between the pedal module, the device and the brake module, the device preferably including an error detection circuit which can detect any errors in the determination of the nominal braking value.

The brake module may be a circular module, with in each case it being possible that a power electronics system for actuating two actuators is contained in the circular module. Actuator-specific functional software (such as clamping force control) for two actuators may be implemented in each of the circular modules.

The modules may be connected by way of a double data bus or rather by way of the data transfer unit. The architecture of the brake system essentially is characterized by the signal and redundancy interfaces of the modules which, e.g., are error-tolerant, fail-silent or failsafe. Thus, the architecture sets special store by the allocation of the function of error detection by means of the modules themselves.

For cost-saving purposes, it is further possible to realize a central module function in a circular module or rather in a brake module.

Thus, in accordance with this invention, it is possible to achieve a modular structure, with errors being isolated on the component level so that error propagation is impossible. Further, by providing the data bus which directly connects the individual modules it is further possible to minimize the distance of transfer of analog signals so that the expenditure for EMC disturbance immunity can be kept relatively small.

A further advantage of this invention lies in the fact that, irrespective of the existence or non-existence of a braking intention, a clamping of a brake which is critical in terms of safety and is caused by an error in a computer, power electronics system or actuator with sensors is rendered impossible.

DETAILED DESCRIPTION OF THE PREFERRED EMBODIMENTS

Figure 1:
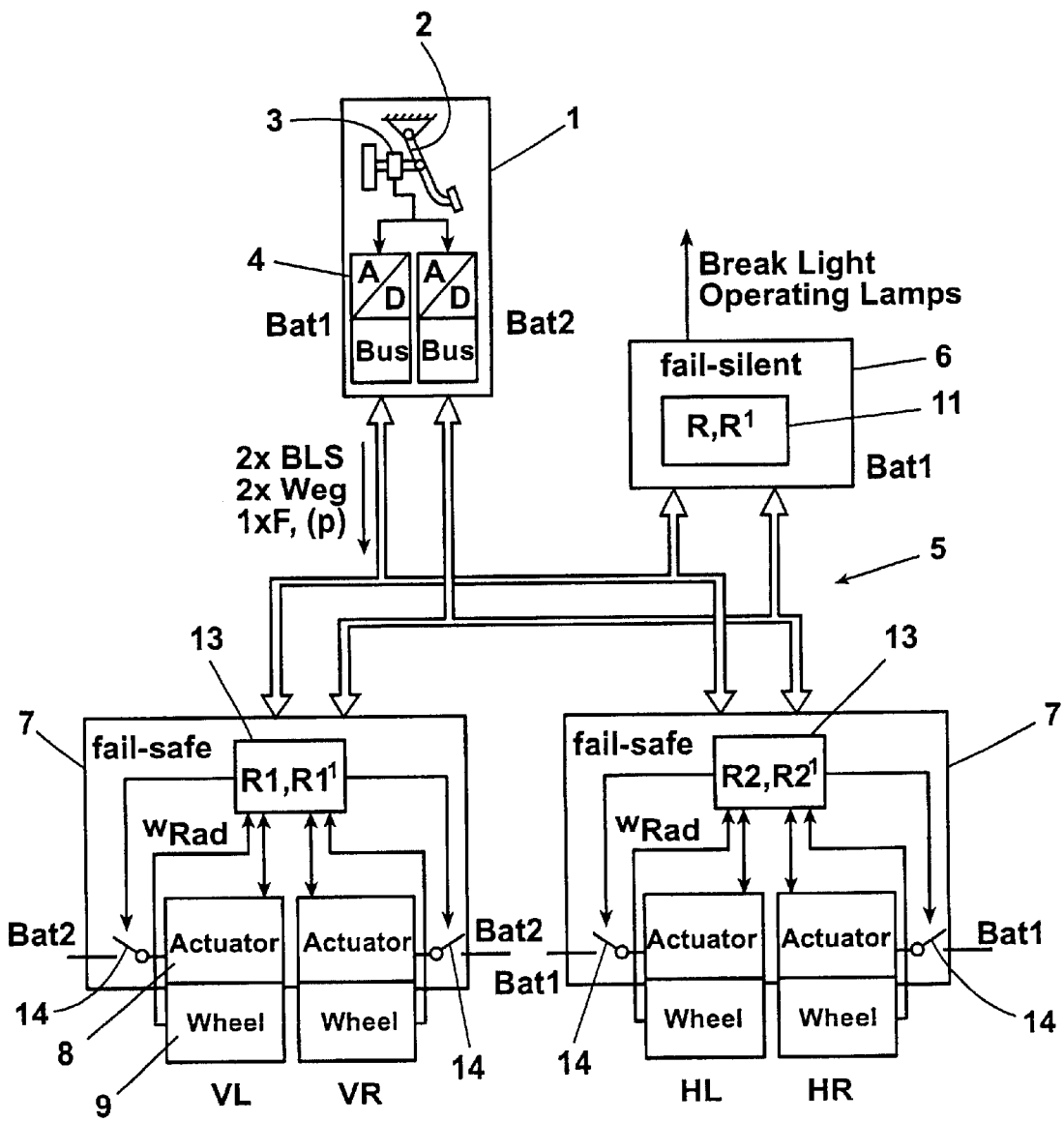
FIG. 1 is a schematical block diagram according to a first embodiment.

FIG. 1 shows a pedal module 1 with a schematically indicated brake pedal 2. Brake pedal 2 or rather the movement of brake pedal 2, e.g., can be detected by means of a sensor system 3 comprising three sensors. It is possible to use two pedal travel sensors and one pedal force sensor. The output signals of this sensor system 3 then are fed to modules for converting the signals of sensor system 3 into digital signals. These modules, e.g., may be two integrated analog-digital converters 4. The analog-digital converters 4 are coupled with a data bus 5.

It is also conceivable to provide each sensor with an analog-digital converter 4 of its own and to transfer the digitized values to two bus couplings (not represented). The first structure (as illustrated) has advantages because of the simpler allocation of the clamping force supply, with the second design having advantages because of the simpler error detection with regard to sensor and converter errors.

In the following, by way of an example, there is to be given a description of the mode of operation of the architecture of the system as per FIG. 1.

The drivers intention to brake can be detected in the pedal module 1 by way of the corresponding sensor system 3. Sensor system 3 features a redundant and dissimilar design. In this case, e.g., the pedal travel and the force applied by the foot are detected. The analog signals of sensor system 3 are locally converted into digital values and transferred without any further preparation to the redundant data bus 5. However, the transferred data may be erroneous.

Data consolidation, i.e., the detection of defective sensors or of defective hardware and a determination of a nominal braking value on the basis of the output signals of sensor system 3, now can take place in this embodiment, e.g., in a central module 6. The nominal braking value determined in central module 6 then can be transferred to brake modules 7 via data bus 5. In the brake modules 7, the nominal braking value or rather the intention to brake then is converted into a nominal value of a clamping force, of a braking torque and/or into an equivalent value.

Central module 6 can superimpose superior functions such as ABS, TSC etc. on the nominal braking value and thus modify the nominal braking value, if necessary. Further the central module 6 may feature a fail-silent design. In the event of an error, the central module will pass over into a safe condition so as not to affect any other components or the overall system adversely. In this embodiment, the central module turns off in case of error detection.

The situation being such, an emergency operation function becomes activated which performs the generation of the nominal braking value in each brake module 7. What is required for this operation is only the evaluation of one sensor signal of sensor system 3. For physical reasons (resolution, noise, etc.), however, it is expedient to evaluate more than one sensor. However, there is no supervision of the redundant sensors in brake modules 7 during the emergency operation function.

If superior functions are implemented in a brake module 7 (see FIG. 2), in this brake module 7, then, the nominal braking value is determined from the sensor signals and transferred to the other brake module 7 by way of data bus 5. In case of failure of one brake module 7 the intact brake module 7 takes over the computation of the nominal braking value. Without implemented superior function, however, the brake module 7 does not perform any data consolidation and error detection.

Figure 2:
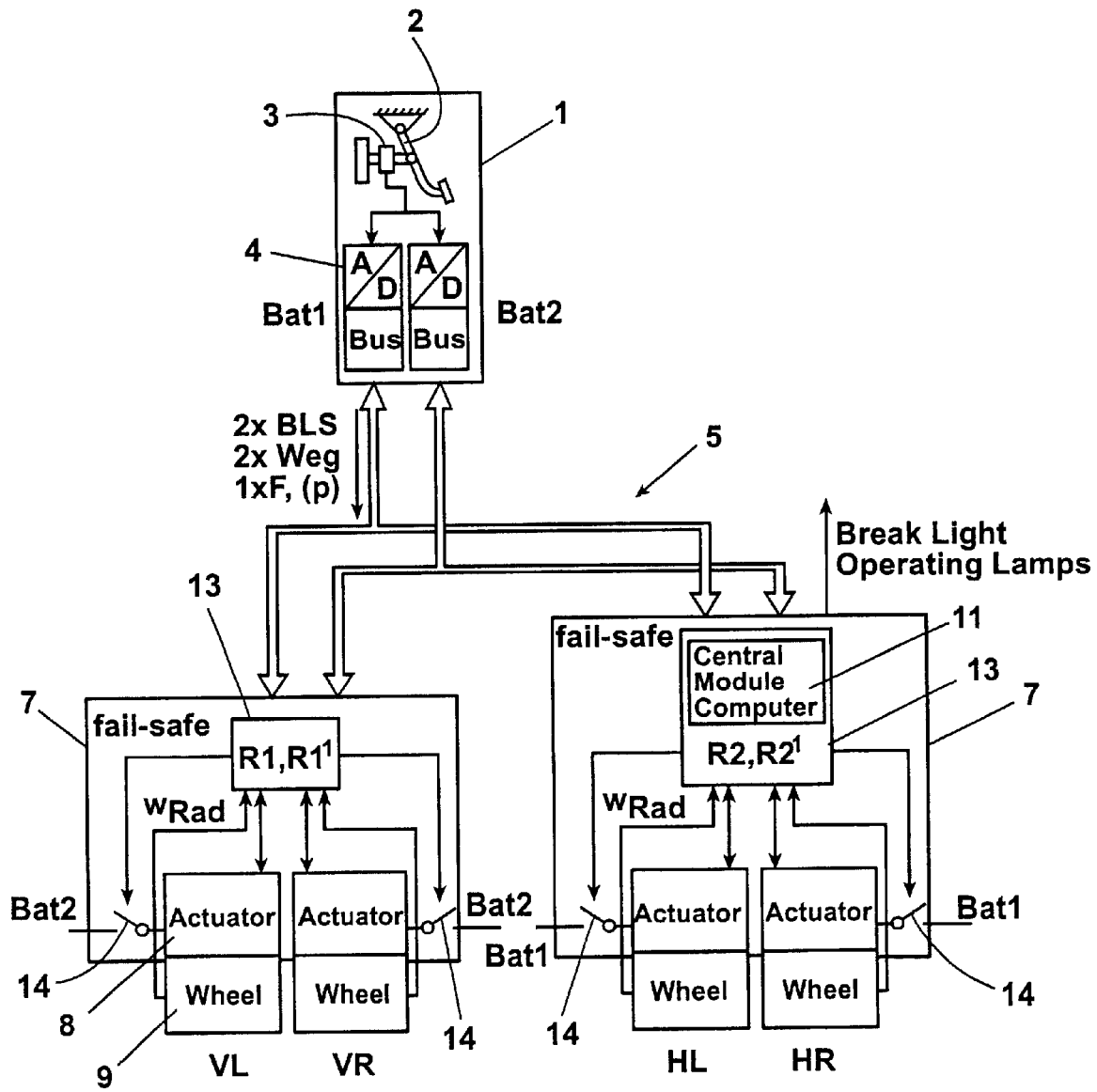
FIG. 2 is a schematical block diagram according to a second embodiment.

FIG. 2 thus includes a low-cost variant of the brake system wherein the central module function is provided in a brake module 7.

FIGS. 1 and 2 illustrate four actuators which can apply a braking force to one wheel 9 each. The actuators 8, e.g., are electric motors pressing the brake linings against a brake disc of wheel 9.

Further represented in FIGS. 1 and 2 is that two power units Bat 1 and Bat 2 are provided, with one power unit each being provided for one brake module 7. It is thus ensured that, upon failure of one power unit, one brake module 7 can continue to be reliably supplied with current. The same is true of the analog-digital converters 4.

The brake modules 7 feature a failsafe design. The power electronics system, the actuators, the sensors of the actuators and the computer of the brake module 7, e.g., are collated with reality by way of computation models. Instead of computation models (such as differential equation) it could, of course, also be possible to provide a prestored table by means of which the measured brake values are supervised, with it being possible to conclude that there is an error in brake module 7 if there is a deviation from the model concept or rather from the values of the measured data stored in the table. Brake module, then, 7 passes over into a safe condition. The brake, then, is released and thus opens or rather only drags on the brake disc of wheel 9. The failsafe design of brake module 7 thus can be achieved by means of hardware redundancy and analytical redundancy (software redundancy).

Each brake module 7 further includes a device for time-synchronous detection of wheel speeds. The wheel speeds are fed to the data bus 5 and transferred to the component or element performing the superior functions. The brake modules 7 have a time basis in common.

Figure 3:
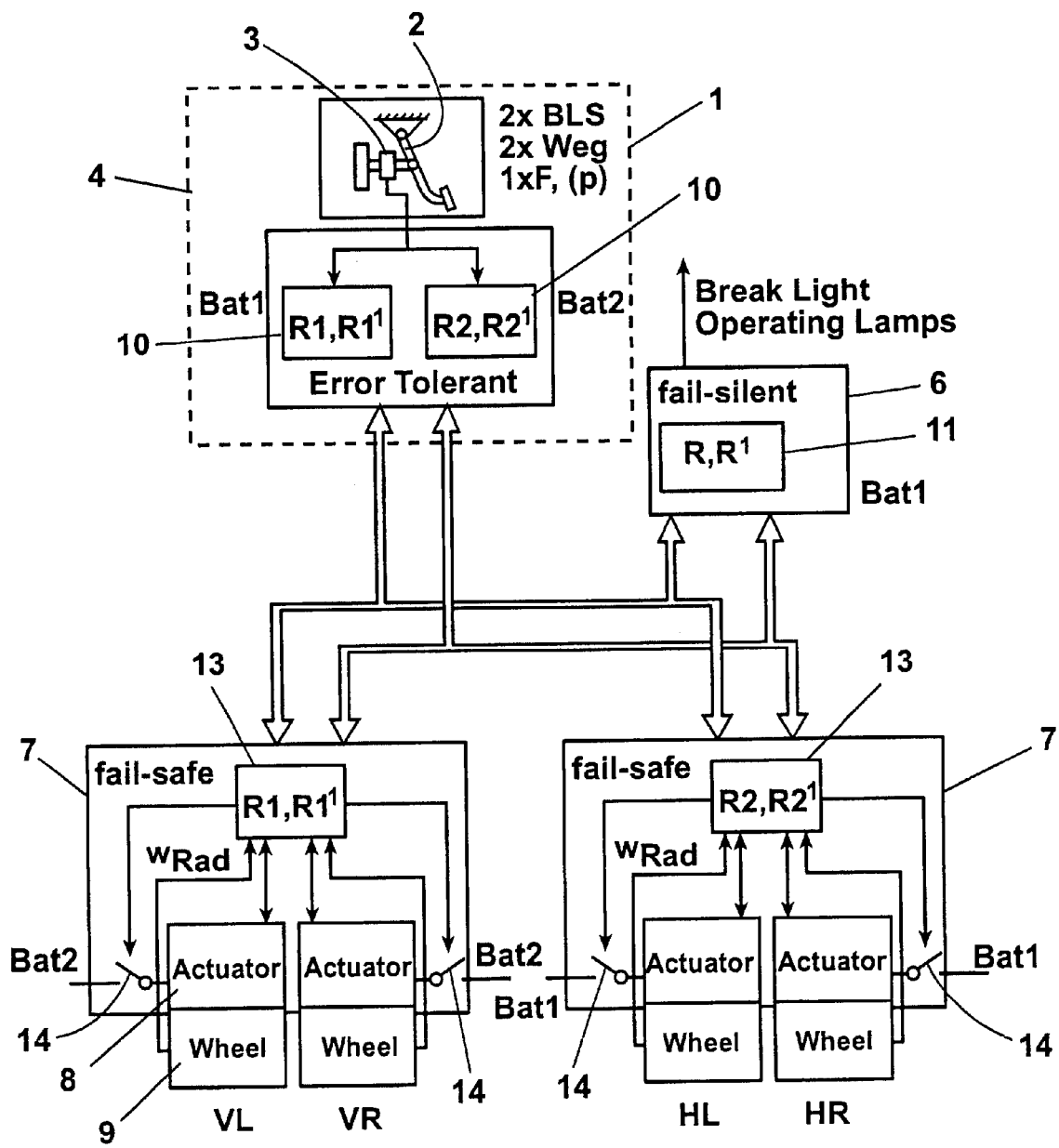
FIG. 3 is a schematical block diagram according to a third embodiment.

FIG. 3 represents a further embodiment of this invention. As in FIGS. 1 and 2, in FIG. 3 the driver's intention to brake is detected by means of a suitable sensor system 3. The sensor system 3 of this embodiment may consist of redundant sensors, e.g., detecting the pedal travel and the force applied by the foot. These analog signals again are locally digitized. Data consolidation, i.e., the detection of defective sensors or of defective hardware and the determination of nominal braking values now takes place in pedal module computers 10. Pedal module 1 thus features an error-tolerant design. The error-tolerant system emits a consolidated signal, with it being assumed that the consolidated signal (namely, e.g., the nominal braking value) is correct. An error of a sensor of the sensor system 3 being detected, the error-tolerant pedal module 1 can reconfigurate itself, with the same function then being possible to be carried out as before without any functional loss.

The consolidated nominal braking value then is transferred to the central module 6, modified by superior functions (ABS, TSC, etc.) if necessary, and then transferred to the brake modules 7. The brake modules 7 then use the nominal braking value for the output of a clamping force, a braking torque or of equivalent data, with the actuators 8 then being applied correspondingly. If there is a failure of the central module 6, an emergency operation function is activated. The same is true when the central module function is realized in a brake module 7.

In the emergency operation function of this embodiment, the nominal braking value is directly converted in each of the brake modules 7 into a corresponding nominal value of the clamping force, the braking torque, etc.

If the superior functions are implemented in a brake module 7 (FIG. 4), then the intention to brake is modified in this brake module 7 and transferred as a modified nominal braking value to the other brake module 7 via data bus 5. This modified nominal braking value then, again, is used for the determination and output of an equivalent clamping force, of a braking torque or of an equivalent value. In case of failure of one brake module 7 the intact brake module 7 takes over the determination of the clamping force, of the braking torque or of the equivalent data.

The design of the pedal module I is a multiple redundancy design. It is possible to provide at least three computers so that the generation of the nominal braking value is error-tolerant.

Figure 4:
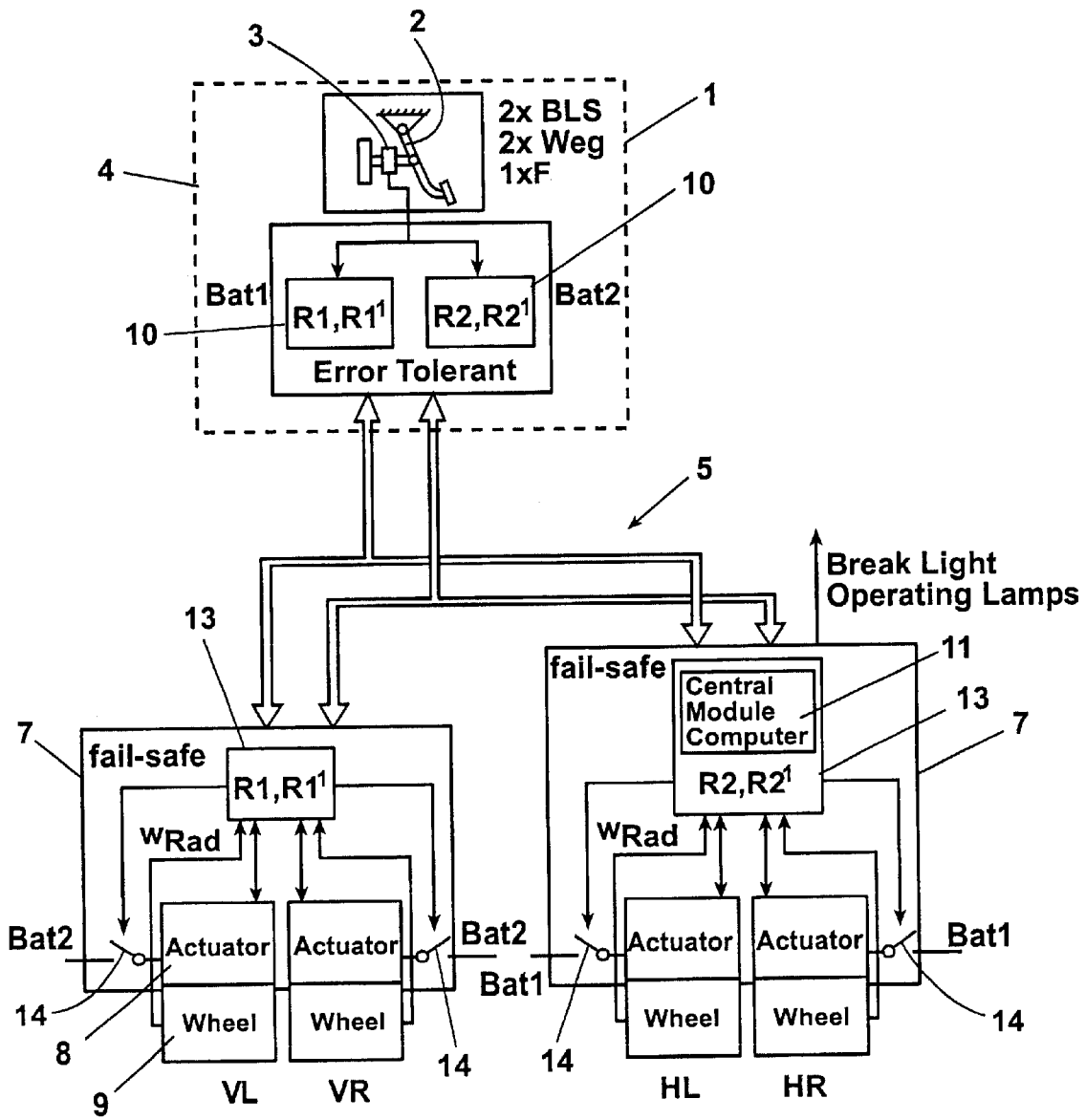
FIG. 4 is a schematical block diagram according to a fourth embodiment.

The example of an embodiment represented in FIGS. 3 and 4 represents a computer structure of the pedal module computer 10 including two redundant computers in a duo/duplex structure. In this variant, the computer of the pedal module 1 consists of four computers (R1, R1', R2, R2'), each time two of them being combined to form a failsafe (fail-silent) structure. A consolidated driver's intention to brake is determined per computer pair and transferred to data bus 5. In case of a computing error the affected redundant computer turns off, i.e., there is either an output of a flawless nominal braking value or of none. It is further conceivable to use a triplex computer with a voter/monitor downstream. In such a structure there would be only the output of a consolidated nominal braking value.

In the following, there will be a more detailed explanation of the functions of the individual modules and elements of the brake system.

The central module 6 or rather the control unit includes the above-mentioned superior functions and, in case of the non-failsafe pedal module 1, performs the determination of the nominal braking value. Further, in case of the non-error-tolerant or rather non-failsafe pedal module 1, the central module 6 performs an error detection of pedal module 1. The central module computer 11 is redundant and turns off automatically in case of an error. Central module 6, then, is either silent (fail-silent) or still reports a message of its failure in order to bring the overall system into a safe condition (failsafe). There is no output of any erroneous value. If the functions of central module 6 are implemented in a brake module 7 (FIGS. 2 and 4), the above statements are equivalently true. In this embodiment, however, there is no central module/brake module interface.

The brake module 7 consists of a redundant brake module computer 13 (R1, R1'), of the power electronics system for two actuators 8 and of a redundant-design or cyclically testable disconnecting unit 14. The actuator-specific sensor signals (such as current, clamping force, position, temperature etc.) are fed to brake module 7 or rather to brake module computer 13.

The disconnecting unit 14 is separated from the power electronics system in terms of safety, i.e., any error in the power electronics system does not have any influence on the function of disconnection. The redundant computer structure ensures that, in case of a disconnecting instruction of the central module 6 or in case of an error in the brake module 7, the disconnecting instruction is carried out locally correctly. Thanks to this structure it is possible to economize on a separate disconnecting line of the central module 6.

In this case, the redundancy interface is failsafe, i.e., the brake module 7 performs its specific function or it turns off automatically in case of failure, reporting a message of the malfunction, or it is silent in case of a computer error. Thanks to the failsafe structure it is ensured that any error is detected and the actuator 8 can be turned off.

Thus, an analytical redundancy (software redundancy) is achieved for the power electronics system, the actuator 8 and the sensors of actuator 8. In this way, an error detection is enabled which is carried out on the basis of the actuator-specific sensors (current sensor, position sensor, clamping force sensor, temperature sensor etc.) and of the specific mathematical model of actuator 8. If the difference (prepared if necessary) between the model output and the measured signals is excessive this means the existence of an error and actuator 8 is turned off.

It is also conceivable to provide a brake module 7 for each of the wheel brakes. It is thereby excluded that there is a circuit failure in case of the failure of one brake module.

What applies to all modules is that redundant computers of the fail-silent or failsafe type, e.g., can be provided by two complete, parallel computers of the same or of a dissimilar structure. It might further be possible to use a duplex computer with core redundancy. Similar structures would also be possible for an error-tolerant triplex computer. However, in a triplex computer an error-tolerant voter/monitor would be required instead of a comparator (duplex computer concept).

The data bus 5 is a double bus and connected with each module. For cost reasons, it is possible to use a reduced double bus 5. It would be possible to economize on the second bus as far as the central module 6 and a brake module. Safety with regard to the braking function in case of failure, however, remains maintained as the connection from pedal module 1 to one of the brake modules 7 (e.g., for the front axle) is a double bus. However, as compared with the complete double bus structure there is a functional loss (superior functions), e.g., in case of a bus failure in the simplex bus. This functional loss, however, may perhaps be tolerable.

The data bus 5 may be a CAN bus (Controller Area Network bus) with an event-oriented data transfer. It is further possible to use a TTP (Time Triggered Protocol) so that a time-synchronous computer network becomes possible.

A central and synchronous detection of the wheel speeds can be performed in central module 6 or in a brake module 7. In a separate detection and preparation of the wheel speed data and bus transfer it is necessary for the detection to be performed in the brake modules 7 in a time-synchronous manner. This is easy to perform by using a TTP bus. A CAN bus would require a major expenditure in order to achieve the needed sychronism.

Two independent power supply sources (Bat 1, Bat 2) are needed for energy supply. By the inventive provision of two actuators 8 in a brake module, in case of an error, there results a degradation which is comparable to a hydraulic brake. Failure of one brake module 7 or of one energy supply unit results in a failure of two brakes 8, 9. Thus it is possible to speak of a circuit failure. If the superior functions are implemented in the brake module 7 concerned (cf. FIGS. 2 and 4) they also fail. This may be tolerable since, in case of a circuit failure, superior functions are not needed any longer, either. In case of a failure in an actuator 8 and in the associated power element and sensors, otherwise, only one wheel brake would be affected. Upon failure of the central module 6, e.g., the superior functions (cf. FIGS. 1 and 3) likewise fail, with the fill wheel brake function being maintained. A failure of one bus does not result in any degradation (with the exception of the case when the aforementioned reduced double bus is used).

The inventive system structure ensures that there does not happen any error propagation. According to this invention, any error is detected before it can have an effect on other functions or modules. Further, couplings are reduced and the communication effort is minimal in case of an error. It is of no importance for error propagation and the effort for error detection whether the function of detecting the driver's intention (determination of the nominal braking value) and of error detection of the pedal sensors are processed in pedal module 1 or in central module 6.

Figure 5:
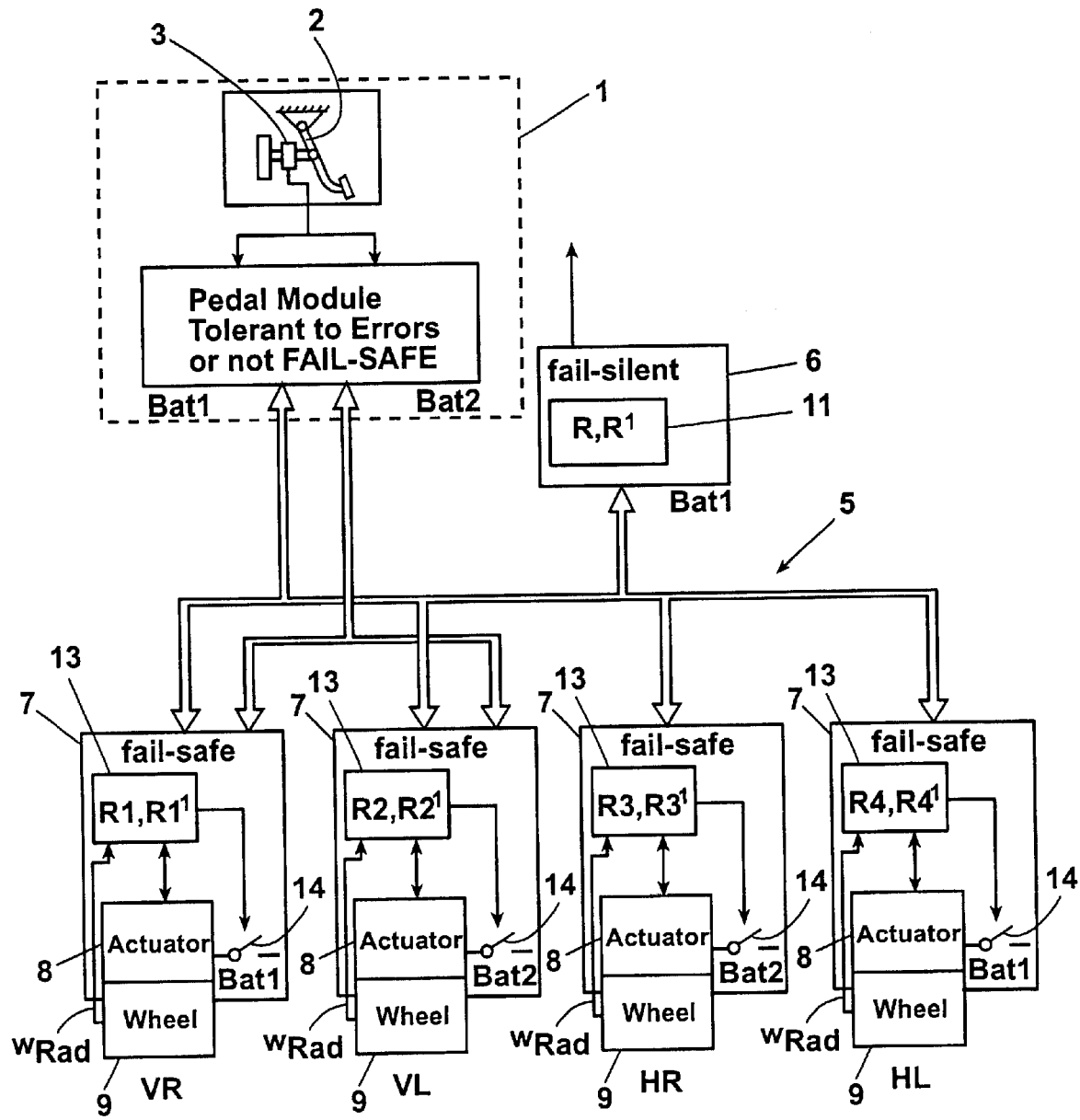
FIG. 5 is a schematical block diagram according to a fifth embodiment of this invention.

FIG. 5 shows another embodiment of this invention. What is different from the preceding embodiments is that each of the brake modules 7 now is provided with a redundant computer 13, a power electronics system, an actuator 8 and the actuator-specific sensors (e.g., current, clamping force, position) and with a redundant-design or cyclically testable disconnecting unit 14 for the clamping force supply of the actuator 8. In particular, redundant computer 13 is now provided for each of the wheel brakes. Thus in case of a failure of computer 13 only one wheel brake is affected as, then, all the other brake modules 7 are continuing to operate flawlessly.

For cost reasons, it is possible to provide a reduced data bus. It is possible to economize on the second bus to the brake modules 7 of the rear axle (HR, HL) and to the central module 6. Safety with regard to the brake's operation in case of an error, however, remains maintained as there is a double provision of the connection from pedal module 1 to the, preferably, front brake modules 7 (VL, VR). However, as compared with the complete double bus structure (cf FIGS. 1 through 4) there is a functional loss in case of an error in the simplex bus. This functional loss, however, is tolerable.

Regarding degradation in case of an error, the functional loss is small. Only in case of failure of one energy supply unit (wheel 1 or wheel 2) there is a failure of two brakes (circuit failure). Otherwise, there is always affected one wheel brake 7, only. Upon failure of the central module 6 only the superior functions (ABS, TSC, ESP, . . . ) get lost, with the full basic braking function remaining maintained. A failure of one bus does not lead to degradation. In a reduced double bus (as illustrated in FIG. 5) it is however possible that there is a failure of the central module 6 and of the brake modules 7 associated with the rear brakes (HR and HL) in case of a bus defect. The architecture can be configured such that in case of an error it is ensured that the rear wheel brakes (HR and HL) are never the only ones at disposal. The system architecture ensures a high braking deceleration in all cases of trouble.

Please note that this invention comprises the above-described functions and systems and modules, respectively, in any combination alone or in their entirety.

What is claimed is:

1. An electromechanical brake system, in particular for automotive vehicles, comprising:
    a pedal module for redundant detection of a driver's actuation of a brake pedal by means of a suitable sensor system,
    a device for determining a nominal braking value on the basis of output signals of the sensor system,
    at least one brake module for actuating at least one wheel brake on the basis of the nominal braking value,
    a data transfer unit, which is provided redundantly and which establishes a data flow connection between the pedal module and the at least one brake module,
    an error detection circuit which detects any errors in the determination of the nominal braking value,
    a control unit for controlling superior functions of the brake system,
    wherein upon a failure of the control unit, the nominal braking value is determined in an emergency function operation by way of the output signals of at least one sensor of the sensor system in the pedal module.

2. A brake system as claimed in claim 1, wherein the control unit is designed as central module or is integrated in the brake module.

3. A brake system as claimed in claim 2, wherein the central module or the control unit integrated in the brake module performs a data consolidation for the purpose of detecting troubles of the pedal module and/or of the control unit.

4. A brake system as claimed in claim 1, wherein the pedal module includes at least two modules which convert analog signals and/or incremental signals of the sensor system into digital signals which are fed into a data bus by way of two bus couplings, separated in terms of safety technology, or are digitally processed further in the pedal module.

5. A brake system as claimed in claim 1, wherein the device for determining normal braking value is provided in the pedal module.

6. A brake system as claimed in claim 5, wherein the pedal module is eerror-tolerant and performs a data consolidation for the purpose of detecting troubles of the pedal module.

7. A brake system as claimed in claim 1, wherein the data transfer unit is a data bus provided as a double bus at least between the pedal module and the wheel module.

8. A brake system as claimed in claim 1, wherein the pedal module at least includes one pedal travel sensor and at least one pedal force sensor.

9. A brake system as claimed in claim 8, wherein the brake module features a failsafe design.

10. A brake system as claimed in claim 2, wherein the central module or the control unit include a fail-silent design.

11. A brake system as claimed in claim 1, wherein the brake module performs an error detection on the basis of local actuator-specific signals and in case of a detected error, it emits a corresponding message to the brake system.

12. A brake system as claimed in claim 11, wherein the error detection is performed, model-assisted.

13. A brake system as claimed in claim 4, wherein the brake module includes a device for time-synchronous detection of a wheel speed and in that the wheel speed is fed into the data bus.

14. An electromechanical brake system, in particular for automotive vehicles, comprising:
    a pedal module for redundant detection of a driver's actuation of a brake pedal by means of a suitable sensor system,
    a device for determining a nominal braking value on the basis of output signals of the sensor system,
    at least one brake module for actuating at least one wheel brake on the basis of the nominal braking value,
    a data transfer unit, which is provided redundantly and which establishes a data flow connection between the pedal module and the at least one brake module,
    an error detection circuit which detects any errors in the determination of the nominal braking value,
    wherein the pedal module includes at least two modules which convert analog signals and/or incremental signals of the sensor system into digital signals which are fed into a data bus by way of two bus couplings, separated in terms of safety technology, or are digitally processed further in the pedal module.

* * * * *

UNITED STATES PATENT AND TRADEMARK OFFICE
CERTIFICATE OF CORRECTION

PATENT NO.    : 6,345,225 B1
DATED         : February 5, 2002
INVENTOR(S)   : Jürgen Böhm, Stefan Stölzl, Peter Willimowski, Joachim Nell and Rainer Oehler It is certified that error appears in the above-identified patent and that said Letters Patent is hereby corrected as shown below:

<u>Column 8,</u>
Line 2, change "eerror-tolerant" to -- error-tolerant --.

Signed and Sealed this

Sixth Day of August, 2002

Attest:

JAMES E. ROGAN
Attesting Officer          Director of the United States Patent and Trademark Office